United States Patent [19]

Armstrong

[11] 4,123,754
[45] Oct. 31, 1978

[54] ELECTRONIC DETECTION AND IDENTIFICATION SYSTEM

[76] Inventor: Frank L. Armstrong, Pleasantville, N.Y. 10570

[21] Appl. No.: 700,185

[22] Filed: Jun. 28, 1976

[51] Int. Cl.² ............................................. G01S 9/56
[52] U.S. Cl. ................................. 343/615 SS; 331/2; 331/55; 343/5 SA
[58] Field of Search ............ 343/6.5 R, 6.5 SS, 5 SA; 325/45, 46, 58; 331/2, 55

[56] References Cited

U.S. PATENT DOCUMENTS

| 2,986,631 | 5/1961 | Jose et al. ................................. 331/2 |
| 3,283,260 | 11/1966 | Vaughan ................................. 331/2 |
| 3,379,992 | 4/1968 | Hoo ............................................. 331/2 |
| 3,798,642 | 3/1974 | Augenblick et al. ........... 343/6.5 SS |
| 3,878,528 | 4/1975 | Majeau ............................ 343/6.5 SS |
| 3,914,762 | 10/1975 | Klensch .......................... 343/6.5 SS |

*Primary Examiner*—S. C. Buczinski
*Attorney, Agent, or Firm*—Larson, Taylor and Hinds

[57] ABSTRACT

An electronic detection and identification system for use in the rapid identification of vehicles at a toll stop, and like uses, is provided which employs an electronic identification card that is carried by the vehicle to be identified and a fixed transmitter-receiver unit that transmits a signal to the card and receives a reflected signal therefrom. The card contains passive resonant circuitry for producing an output signal having a frequency which is a selected harmonic of the signal transmitted thereto. In operation, the card is radiated with a signal which has a freqency in the Gigahertz range and which is produced by frequency sweeping and multiplying a frequency stable RF signal. The signal reflected by the card is narrow band-filtered and RF amplitude (envelope) detected. The detection envelope, which is the "signature" of the received signals, is compared with a reference profile to determine whether a match exists. An appropriate action, such as the generation of a "go" signal, is initiated based on the results of the comparison.

12 Claims, 10 Drawing Figures

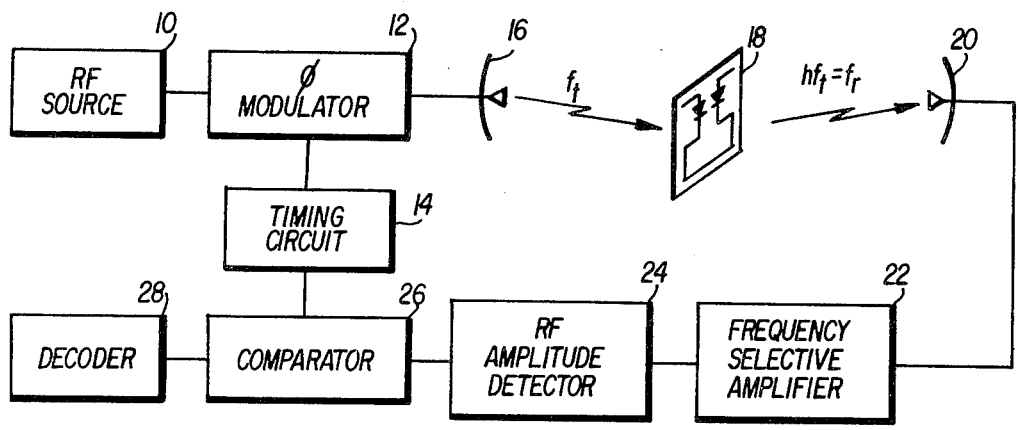
FIG. 1
FIG. 4A
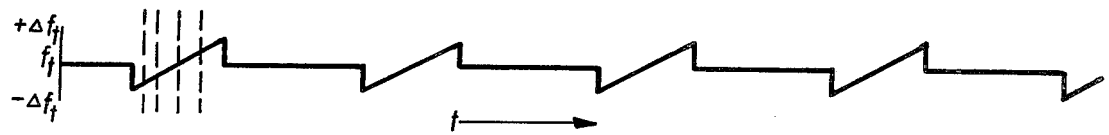
FIG. 4B
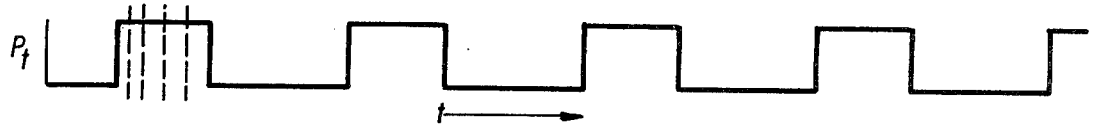
FIG. 4C
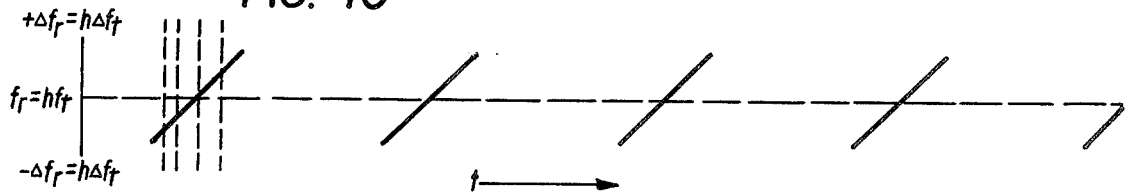
FIG. 4D
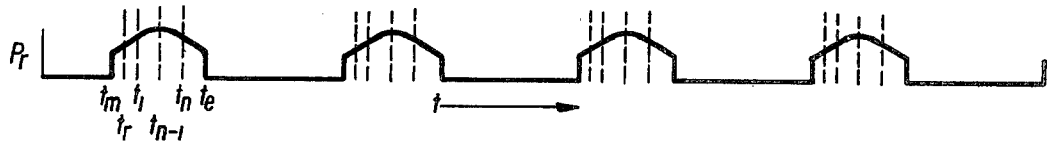

ELECTRONIC DETECTION AND IDENTIFICATION SYSTEM

FIELD OF THE INVENTION

The present invention relates to an electronic detection and identification system which employs a card or like carrier member that produces a characteristic output when radiated with a signal of a predetermined frequency.

BACKGROUND OF THE INVENTION

Toll booths on public roadways and highways are notorious bottlenecks in highway travel. The problem has been one of increasing seriousness with the ever increasing volume of highway traffic and a number of systems have been proposed in an attempt to provide rapid identification of vehicles at a toll site without requiring the vehicles to stop or slow down.

Some of these systems employ optical detection while others utilize radio frequency or microwave transponders. These systems have not been successful for a variety of reasons including technical problems associated with the equipment itself, disadvantages caused by the bulkiness and/or expense of the equipment and the like.

A number of systems have been proposed which employ a microwave signal responsive target, such as a card or the like, and these systems possess certain advantages. In such systems, the target comprises passive non-linear elements and a harmonic (usually the second) of the transmitted fundamental is reflected by the target and detected to provide identification. One example of such a system is that disclosed in U.S. Pat. No. 3,631,484 (Augenblick) where a target (harmonic generator) produces, in response to a transmitted signal radiating the target, a signal having frequency which is a combination of a harmonic of the transmitted signal and a frequency shift due to the movement of the target. The doppler shift is significant in the Augenblick system and a frequency measuring device is employed in the system receiver to determine the reflected frequency. In a somewhat similar system disclosed in U.S. Pat. No. 3,798,642 (Augenblick et al) an amplitude modulator is employed in the transmitter and the receiver is tuned to the modulating frequency. The target includes a frequency selective network for producing a coded arrangement of signal components which makes up the reflected signal.

A further system which employs basically similar components is that disclosed in U.S. Pat. No. 3,914,762 (Klensch). In this system a target (identification tag) is employed which produces a beam of energy that is pulse modulated in accordance with a preset identification code. The system receiver receives the reflected beam and generates signals which are representative of the code modulation.

Other patents of possible interest include U.S. Pat. Nos. 3,772,691 (Hansen); 3,798,641 (Preti); 3,918,057 (Van Tol); 3,633,158 (Heibel); 3,377,616 (Auer, Jr.); 3,714,649 (Brouwer, et al); and 3,546,696 (Waters et al) although this listing is not, nor is it represented to be, exhaustive.

SUMMARY OF THE INVENTION

According to the invention, an electronic detection and identification system is provided which affords substantial advantages as compared with prior art systems such as discussed above. In common with several of the referred to hereinbefore systems, the invention employs a target in the form of a card of the like which produces a characteristic response to a transmitted signal radiated thereon, i.e., generates a harmonic of the transmitted fundamental. However, the system of the invention differs significantly from prior art systems in a number of basic regards and provides advantages as compared with these systems with regard to reduced complexity, simplicity and flexibility of coding, and ease of adaptation, among other advantages.

According to a preferred embodiment thereof, the system of the invention comprises a transmitter for radiating a frequency swept r.f. signal towards a target. The transmitter preferably employs a low frequency crystal which is used to generate a very stable signal and a multiplier chain for raising the frequency of the transmitted signal. The location of a frequency modulator within the chain controls the frequency sweep of the radiated signal. The target preferably comprises an electronic identification card which includes passive circuitry including an antenna, a resonator and a non-linear device printed thereon. The circuitry on the card is designed to be tuned to a selected harmonic of the transmitted signal. The selected harmonic is reflected from the card towards the receiver antenna of a receiver which receives and processes the signal. The receiver includes a mixer which is used to down convert the received signal to a frequency which is compatible with a detector and comparator circuitry used. The received signal is amplitude detected to derive a baseband signal corresponding to the intermediate frequency (I.F.) envelope. The comparator circuitry referred to above is used to compare selected sample points with those of a reference profile to determine whether a match exists, within predetermined tolerances, with the received signal. The output of the comparator is utilized for control purposes and, in a traffic control system, it can, for example, be employed to control actuation of a traffic control gate or barrier.

The use of simultaneous frequency sweeping in the transmitter and receiver, and amplitude (envelope) detection in the receiver provides a number of advantages. For example, as is described in more detail hereinbelow, the receiver bandwidth can be made to be very narrow, thus minimizing the transmitted signal power. To this end, in accordance with an advantageous embodiment of the invention, "data" and "reference" multiplier chains are used in both the transmitter and receiver, the latter performing the same operations as the former. The transmitter and receiver reference signals are mixed in a duplicate receiver mixer to produce an output at the intermediate (I.F.) frequency. This output, and that of a crystal oscillator operating at the IF frequency, form the inputs to a phase locked loop which controls the operation of the receiver oscillator, making the latter track the transmitter oscillator and resulting in a very high quality IF frequency signal.

The cards used can be relatively small in size (about that of a "3×5" card) and can be readily displayed on the windshield of a vehicle. Moreover, by simply covering the cards with a coating that is visually opaque but transparent to r.f. energy, counterfeiting of the cards is substantially prevented.

Other features and advantages of the invention will be set forth in, or apparent from, the detailed description of a preferred embodiment found hereinbelow.

BRIEF DESCRIPTION OF THE DRAWINGS

FIG. 1 is a block diagram of the basic units of the electronic identification system of the invention;

FIGS. 4(a) to 4(d) illustrate, in an exemplary manner, the significant waveforms associated with the system of the invention;

DESCRIPTION OF THE PREFERRED EMBODIMENTS

Figure 2:
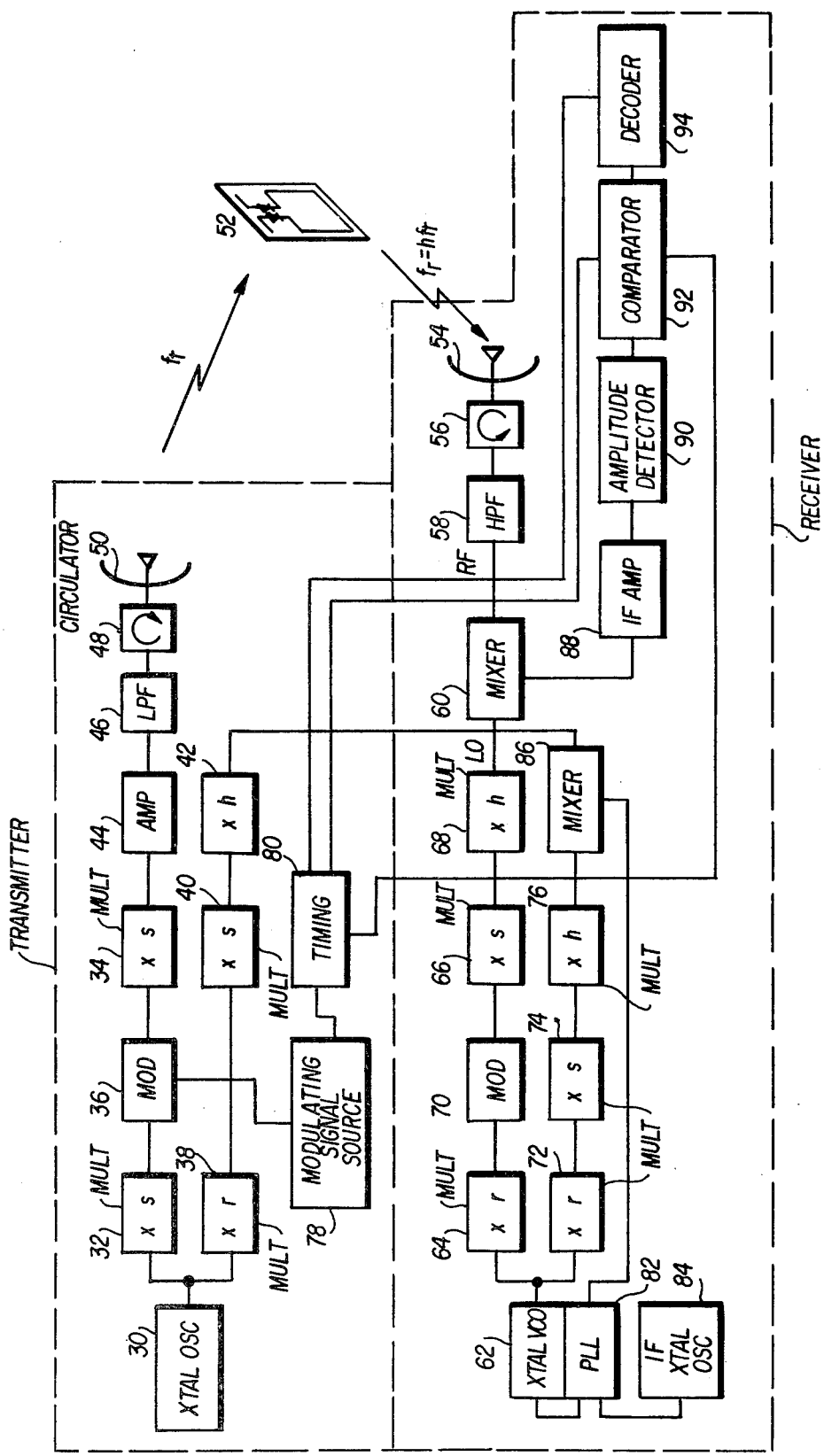
FIG. 2 is a schematic block diagram of a single channel embodiment of the invention.

Although the invention will be described relative to the utilization thereof at a toll station or the like, it will be appreciated that the invention can be used in other ways, some of which will be described hereinbelow, and hence the exemplary application described is not intended to be limiting.

Referring to FIG. 1, wherein the basic integers of the identification system of the invention are illustrated, an r.f. signal is generated by an r.f. signal source 10 which is part of the system transmitter. The r.f. source 10 is connected to a modulator 12 which frequency modulates the r.f. signal during specific time periods. These time periods are dictated by a timing circuit 14 which is connected to modulator 14. The output of modulator 12 is connected to a directional antenna 16 which radiates a corresponding signal having a frequency $f_t$ towards a card 18 containing passive circuitry printed thereon. The card 18, which is referred to hereinafter for purposes of convenience as an electronic identification card or EIC, is described in more detail below. For present purposes, it suffices to note that EIC 18 receives the signal from antenna 16 and, in response thereto, retransmits a signal $f_r$ which is a selected harmonic thereof, i.e., $f_r = hf_t$, where $h$ is the harmonic selected.

The reflected signal is received by a directional antenna 20 which is part of the receiver unit of the system. The output of antenna 20 is connected to a frequency selective amplifier 22 which provides linear amplification of the reflected signal. An RF amplitude detector 24 measures the amplitude of the output signal produced by amplifier 22 to determine the amplitude "signature" of the reflected signal. This signature is compared with a reference signature by a comparator 26. Operation of comparator 26 is synchronized with that of modulator 12 by means of timing circuit 14. The output of comparator 26 is applied to a decoder 28 which provides an appropriate indication of the results of the comparison and which can be extremely simple in construction. For example, if a match is noted by comparator 26, decoder 28 can be designed to simply provide a "go" signal to a suitable traffic controller which permits a vehicle to pass. The complete traffic control units will characteristically include traffic lights, alarms, cameras, barriers or gates and the like, that are used to direct the traffic in accordance with the signals produced by the decoder.

It should be noted that the propagation distances that are required are generally very short and the time delay associated with the reflected signal is negligible, thereby permitting the modulation and comparison functions to be performed simultaneously.

With the overview provided by the description of FIG. 1, a more detailed embodiment of the invention, adapted for single channel operation, will now be considered. Referring to FIG. 2, the transmitter portion of the system includes a crystal oscillator 30 that generates a frequency stable signal which is applied to first and second frequency multiplier chains. The first chain, which is referred to as the "data" chain, comprises multipliers 32 and 34 while the second, referred to as the "reference" chain, comprises multipliers 38, 40 and 42. The "data" chain is broken down into two separate multipliers 32 and 34 so as to enable a modulator 36 to be included in the circuit at an electrically convenient point. The multiplied and modulated output of multiplier 34 is connected through an amplifier 44 and a low pass filter 46 to a conventional circulator 48 which provides impedance matching and isolation. An antenna 50 connected to circulator 48 radiates a corresponding signal towards an EIC 52 which reflects a preselected harmonic thereof.

The receiver portion of the system includes a receiver antenna 54 which receives the reflected signal $f_r$. The output of antenna 54 is connected through a circulator 56, which provides the required isolation and impedance matching, and a high pass filter 58, to a first, "RF," input port of a mixer 60.

Mixer 60 receives a second signal, at a second, "LO" input port, which is derived from a voltage controlled crystal oscillator 62. Oscillator 62 generates a frequency stable signal which is transmitted to third and fourth multiplier chains. The third multiplier chain, which is referred to as the receiver "data" chain, includes multipliers 64, 66 and 68 while the fourth, the receiver "reference" chain, comprises multipliers 72, 74 and 76. The multipliers 64 and 66 of receiver data chain provide multiplication by the same multiplication factors viz., "$r$" and "$s$" as multipliers 32 and 34 of the transmitter data chain while multiplier 68 provides multiplication by a factor "$h$" corresponding to the harmonic multiplication provided by EIC 52. Thus, the receiver data chain raises the oscillator frequency up to a frequency which differs from the EIC-reflected frequency by an intermediate frequency IF. To further ensure appropriate frequency matching, a modulator 70 having characteristics identical to those of modulator 36 is connected in the receiver data multiplier chain at the same point that modulator 36 is connected in the transmitter data multiplier chain. Modulators 36 and 70 are driven by the same modulating signal source 78, which is controlled by a timing circuit 80.

The frequency output of oscillator 62 is controlled by a phase locked loop (PLL) 82 which is connected to receive the outputs of a crystal oscillator 84 and a further mixer 86. Mixer 86 receives the output of the transmitter reference multiplier chain as one input and the output of the receiver reference chain. Multipliers 38, 40 and 42 provide multiplication by factors of "$r$," "$s$" and "$h$," respectively and multipliers 72, 74 and 76 provide multiplication by the same factors, so that the paths from the oscillators 30 and 62 to mixer 86 are equalized. Thus, the arrangement including mixer 86, oscillator 84 and phase locked loop 82 ensures that oscillator 62 is locked to the appropriate frequency, as is described in more detail hereinbelow.

The output of mixer 60 is connected through an IF amplifier 88 to an amplitude detector 90, a comparator 92 and a decoder 94 which perform the same functions as described above with reference to FIG. 1.

The signals appearing at the LO port and r.f. port of mixer 60 will have several important characteristics. First, the frequencies of the signal at these ports will differ by the IF frequency at all times, apart from minor variations due to noise and doppler shift caused by motion of EIC 52. Second, in an illustrative embodiment, the signal level at the LO port will be on the order of 0 to +6 dBm while the level at the r.f. port will be less than −40 dBm. The IF output signal amplitude will, therefore, be proportional to the r.f. port signal amplitude. Third, the signal level at the LO port will be constant with frequency modulation (or will have a known amplitude versus frequency characteristic) whereas the signal level at the r.f. port of mixer 60 will vary with frequency modulation in accordance with the resonant circuit characteristic of the EIC 52.

An important feature of the system of FIG. 2 is that the signal to noise ratio at the receiver is minimized, thereby minimizing the transmitted signal power. This is accomplished by reducing the Noise Figure of the receiver to as low a value as possible which, in turn, is accomplished by minizing the receiver information bandwidth. By frequency modulating both the LO and r.f. signals to mixer 60, the IF frequency is allowed to remain constant, thereby requiring only sufficient bandwidth to pass the EIC 52 signature data and the frequency variations due to noise and doppler shift. Further, the multipliers of the "reference" multiplier chains of the transmitter and receiver perform the identical operations as those of the "data" chains, including the harmonic multiplication (by "$h$"), less modulators 36 and 70. Further, the transmitter and receiver reference signals are mixed in a separate receiver mixer 86 the output of which is a signal at precisely the IF frequency. Since crystal oscillator 84 also produces a signal at the IF frequency, a frequency related error voltage produced by the phase lock loop 82 causes oscillator 62 to track the transmitter oscillator 30. This results in a IF frequency of very close tolerance.

It is noted that the restraints on the receiver bandwidth will be determined by (i) the EIC 52 signature data bandwidth, (ii) any noise resulting from frequency disparities between the transmitter and receiver, (iii) minimum bandwidth design limitations on the tuned circuits employed, and (iv) the doppler frequency shift caused by motion of the EIC. Of the four, the last is believed to be the most significant.

Figure 3:
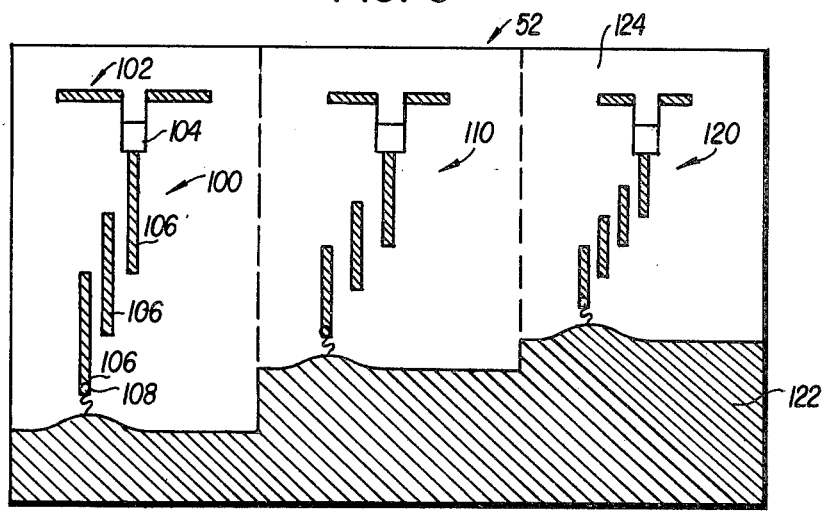
FIG. 3 is a plan view of an exemplary embodiment of an electronic identification card (EIC) constructed in accordance with the invention.

Referring to FIG. 3, an exemplary embodiment of the EIC 52 of FIG. 2 is illustrated. In general, the toll card or EIC is fabricated of a dielectric paper, carboard or other suitable material on which the circuit elements are printed using gold, silver, copper, or a suitable high conductivity printing ink. In general, the circuitry on card 52 is designed to be tuned to and re-transmit (or reflect) a harmonic, (usually the second or third) of the transmitted fundamental. If additional selectivity is required or desired, circuitry can be added, which is tuned to the transmitted fundamental. Thus, in FIG. 3, the card 52, which is shown substantially the actual size, includes a series of three resonator systems 100, 110 and 120, each resonating at a different frequency. The card may include a metal backing 122 which serves as a ground plane and covers the entire reverse side of card 52. Resonator systems 100, 110 and 120 are formed on an insulating layer of substrate 124 using simple, conventional printed circuit techniques. The resonator systems are substantially identical in their overall make-up, and considering system 100 as exemplary, the system includes an one-half wavelength dipole antenna 102 which is connected through a conventional Wilkinson divider 104 or other coupling circuit to three resonators 106. The lengths of resonators 106 are equal to $\frac{1}{2} \lambda$ at the transmitted frequency. One of the resonators 106 is connected through a high frequency diode pill 108 to ground plane 122 which serves to clip the received signal, thereby generating harmonics thereof. The wavelengths corresponding to signals having a frequency of 5 GHz or more is about $2\frac{1}{4}$ inches ($5\frac{3}{4}$ centimeters) and less, so that the resonant circuits and filters designed to operate at these frequencies using strip line techniques and variations thereof, are small enough that several can be printed on a 3-inch by 5-inch card. The size factor determines the lowest frequency for the transmitted signal employed by the system. Other circuit configurations can be obviously utilized and, for example, a log periodic antenna can be implemented using printing techniques. By coating the card 52 with a r.f. energy transparent coating which is visually opaque, the configuration of the card is completely hidden, making the card almost impossible to counterfeit.

Figure 7:
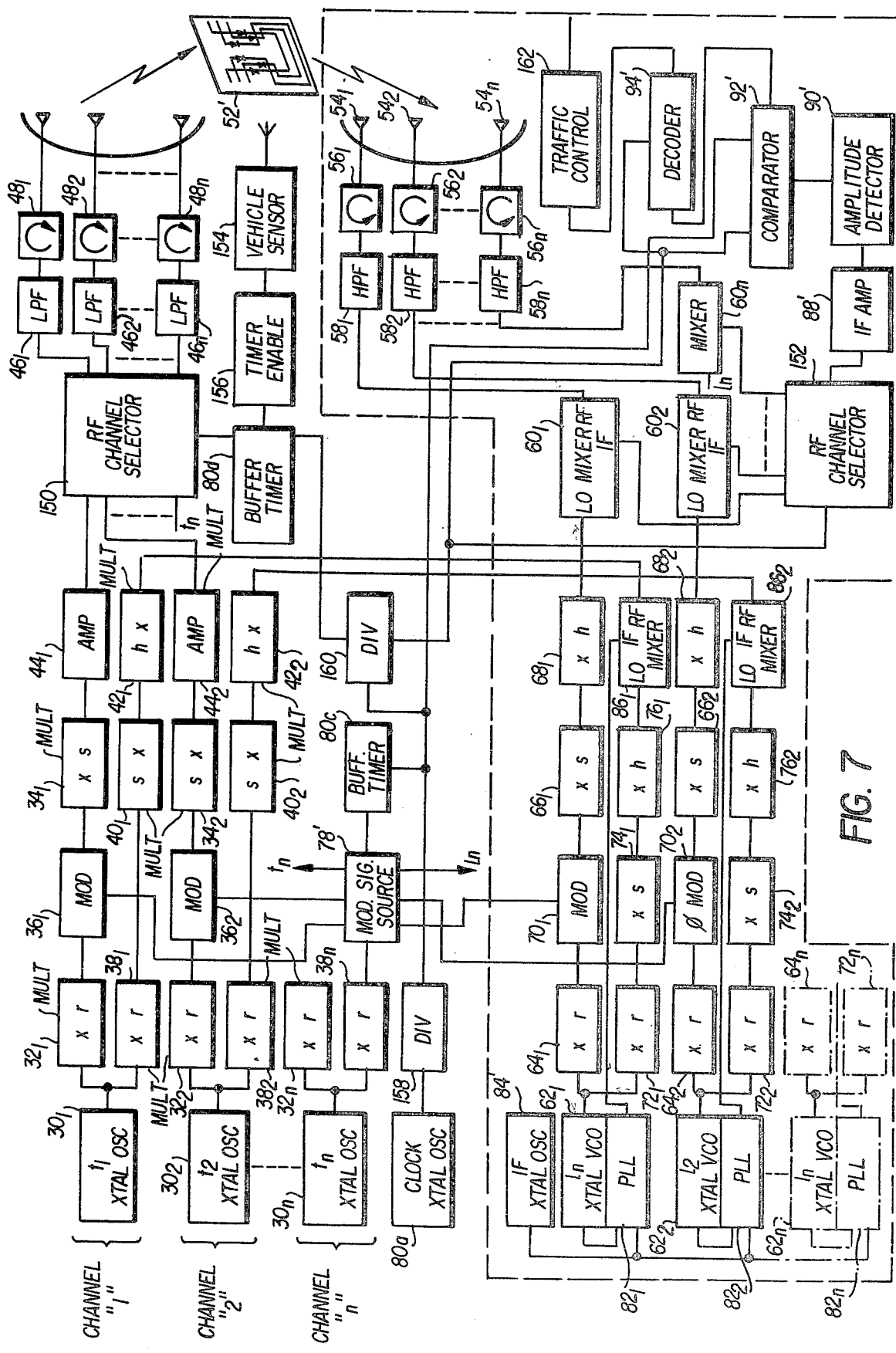
FIG. 7 is a block diagram of a multi-channel system in accordance with the invention.

Referring to FIGS. 4(a) to 4(d), the significant waveforms of a single channel embodiment of a multi-channel system in accordance with the invention are shown. Although the waveforms are those of a single-channel system, generally the same considerations apply to multi-channel systems such as illustrated in FIG. 7. As shown in FIG. 4(a) which illustrates the transmitter frequency characteristic as a function of time, a linear frequency ramp is used to provide the required modulation. It will be understood that this form of modulation is illustrative only and other forms can also be used, as long as the form selected is repeated, as shown. FIG. 4(b) shows the relative signal power radiated from the transmitter antenna. Although, as illustrated in FIG. 4(d), the transmitter power output is constant during frequency modulation, it will be appreciated that this has been done for illustrative purposes only and the power output can vary in any known, repeatable manner. FIG. 4(c) shows the frequency characteristic of a harmonic of the transmitted (reflected) signal produced by the EIC. The slope or inclination of the ramp in FIG. 4(c) is greater than that of FIG. 4(a), thereby emphasizing the fact that the frequency deviation will be greater than that transmitted. This deviation will be a function of the selected harmonic and it will never be less than two times the transmitted frequency derviation.

FIG. 4(d) illustrates the relative signal power of a harmonic of the transmitted signal after filtering and reflection by the EIC and as acquired by the receiver antenna. Although the specific shape shown is only illustrative, and will be determined by the selected harmonic frequency as well as the reflection characteristics of the EIC, this curve contains the critical information used in identification of the EIC. In particular, as is explained in more detail hereinbelow, this curve, which is referred to as the reflected signature, is compared with a reference profile to determine whether a match exists. In FIG. 4(d) the points $t_m$ and $t_e$ are the starting and stopping points of the modulation and transmission, while the point $t_r$ is a comparator reference measurement point and t1, tn-1, tn are typical comparison points. Reference point $t_r$ is used to provide proper orientation of the signature where the signatures has, for example, been shifted up or down due to outside influences.

Figure 6:
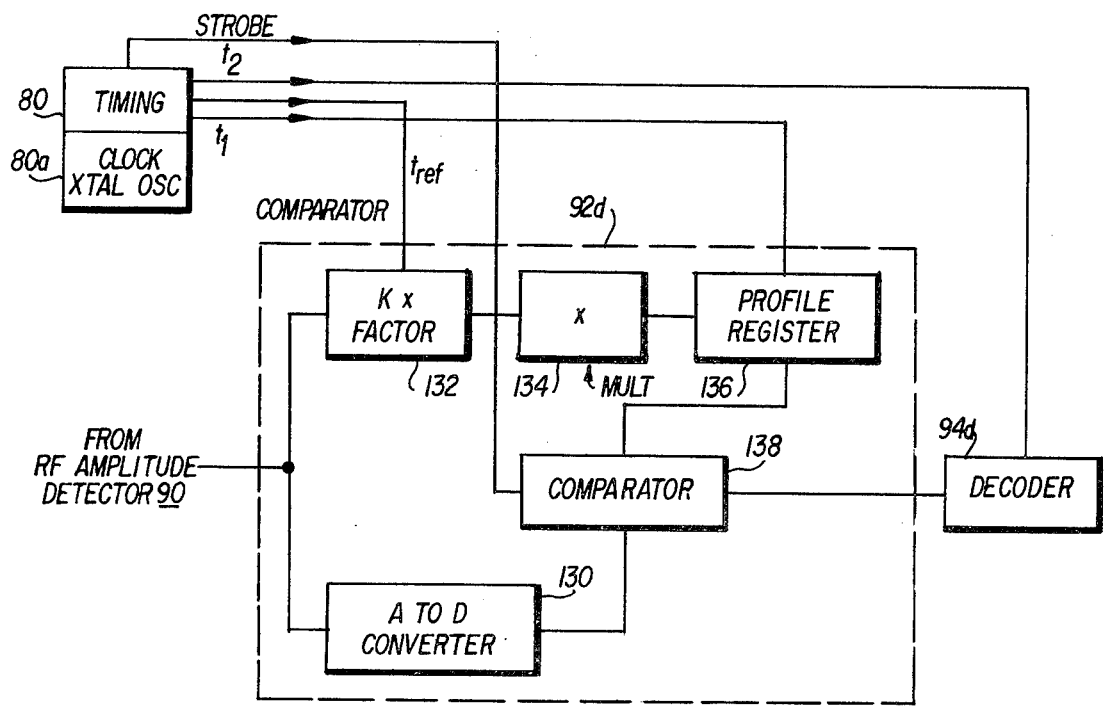
FIG. 6 is a block circuit diagram of a digital embodiment of the comparator of FIG. 2.

It will be appreciated by those skilled in the art that the units making up the system of FIG. 2 are conventional and can be readily implemented using so-called "off-the-shelf" components. However, one unit requires special comment, viz., comparator 92, particularly in view of the critical nature of the signature identification aspects of the invention. An analog embodiment of the comparator is illustrated in FIG. 5 while a digital embodiment is illustrated in FIG. 6.

Figure 5:
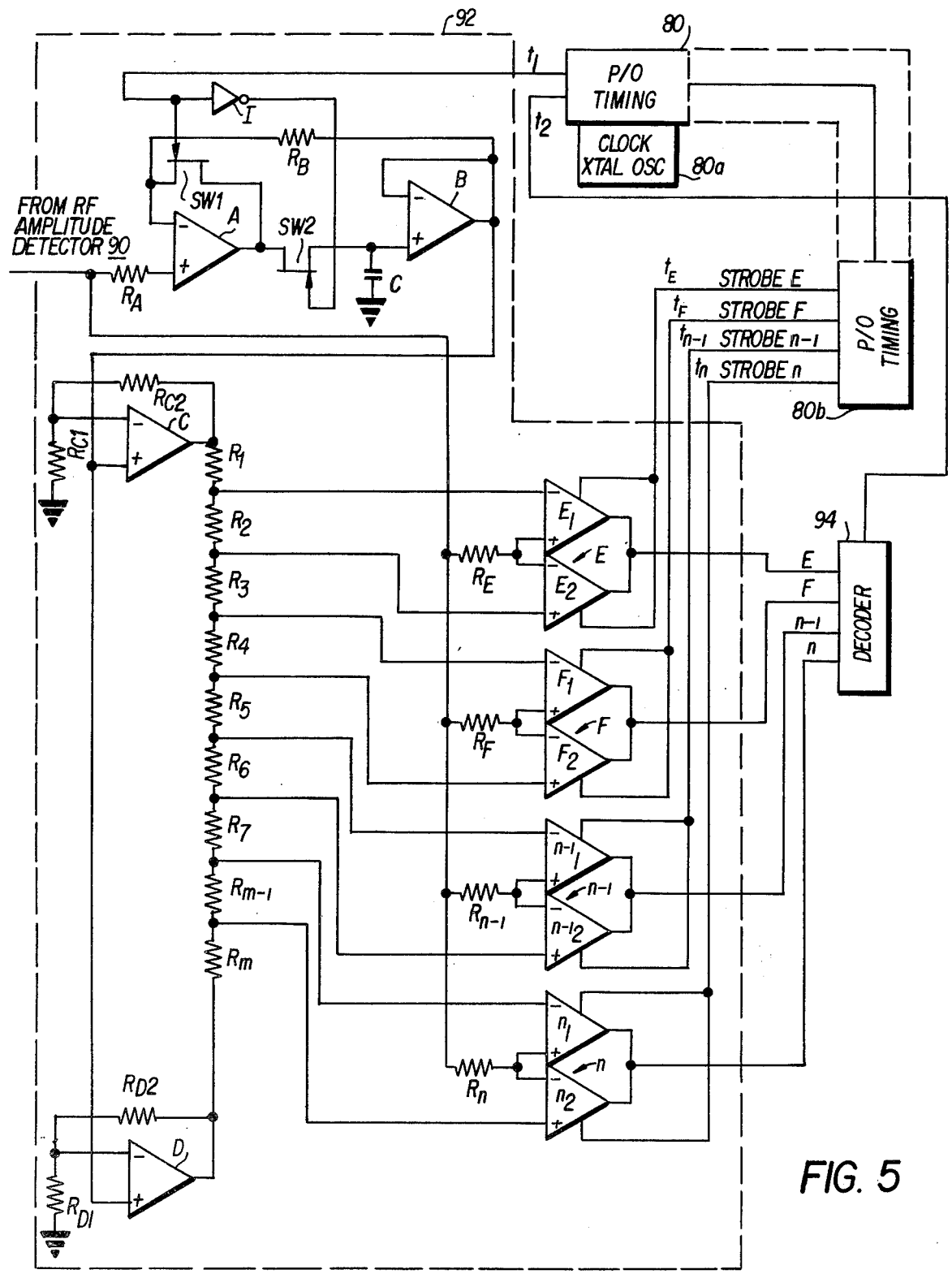
FIG. 5 is a schematic circuit diagram of an analog embodiment of the comparator of FIG. 2.

Referring to FIG. 5, an analog comparator corresponding to comparator 92 is shown within dashed lines. Comparator 92 measures the signal from amplitude detector 90 shortly after the start of the modulation period. The signal level at this instant, which corresponds to the time $t_r$ of FIG. 4(d), is retained as reference for the remainder of the modulation period by a sample and hold circuit which basically comprises a pair of operational amplifiers A and B and a pair of FET transistor switches SW1 and SW2 connected as shown. Operational amplifier A is connected to receive the output of amplitude detector 90 through an input resistor RA while a second resistor RB is connected back from the output of operational amplifier B to the source electrode of FET transistor switch SW1. A capacitor C is connected to ground from a point on the connection between the source electrode of transistor switch SW2 and the non-inverting input of operational amplifier B. Timing is provided from timing circuit 80 which is connected to the gate electrode of switch SW1 and, through an inverter I, to the gate electrode of switch SW2.

The output of operational amplifier B, which is the output of the sample and hold circuit, is connected to first and second "reference level set" amplifiers C and D. Amplifiers C and D include resistors $R_{C1}$ and $R_{C2}$ and resistors $R_{D1}$ and $R_{D2}$, respectively associated therewith and the outputs of each are connected to a profile network formed by resistors R1 to RM, as illustrated. Through this arrangement, the reference level set circuit formed by amplifiers C and D compensates for variations in the reflected signals due to variations in the signal level caused by varying distances between the antennas 50, 54 and the EIC 52, and changes in propagation loss.

The comparison function of comparator 92 is performed by a series of window comparators E, F ... n-1, n. These comparators are continuously fed with the detected signal during the modulate/compare period through corresponding input resistors $R_E$, $R_F$, ... $R_{N-1}$, $R_n$. As illustrated in FIG. 4, timing circuit 80 includes a clock crystal oscillator 80a and a timing section 80b the latter of which produces a series of strobe pulses E, F . . . n-1, n at the times $t_E$, $t_F$, $t_{n-1}$, $t_n$. These pulses serve to strobe window comparators E ... n "on" at the appropriate instant in time corresponding to the level position of a particular comparator in the profile network. Thus, if the reflected signature i.e., the output signal from amplitude detector 90, corresponds to the reference signature provided by the profile network, window comparators E ... n will indicate a "true" or "go" condition and a corresponding output will be provided by decoder 94. Otherwise, a false condition signal will be produced.

The profile network referred to above is adjusted to provide selected tolerances at each comparison point so as to allow for minor deviations from the expected norm. The EIC filter characteristics, the amplitude detector sensitivity, the noise intrinsic in the system, the timing increments, and the desired comparison precision are factors which will determine the number of comparison points employed during each modulate/compare period. Although the reflected signal level will vary due to EIC motion during the modulation period, the speed of the automobile relative to the modulate/compare period render such variations negligible. However, if it is desired to compensate for EIC motion, this can be accomplished by minor adjustments in the reference profile, or by inserting a ramp generator (not shown) between the output of the sample and hold circuit and the input to the reference level set circuit of FIG. 5. Such a ramp generator would be triggered "on" at the start of each modulate/compare period, and the slope and amplitude of the ramp would be a function of the reflected doppler frequency shift.

Referring to FIG. 6, a digital embodiment of comparator 92 of FIG. 2 is illustrated. The comparator, which is denoted 92d in FIG. 6, includes an analog to digital (A/D) converter 130 which continuously converts the analog output signal from detector 90 into a corresponding digital signal. The signal from detector 90 is also read continuously to a circuit 132, referred to here as a "kx" factor circuit, which calculates the input signal reference level to compensate for variations in the reflected signal levels caused by the varying distances between antennas 50, 54 and EIC 52 and changes in propagation loss. A multiplier 134 controlled by circuit 132 multiplies the input signal by the appropriate factor and the resultant output is applied to the input of a profile register 136. Operation of profile resistor 136 is controlled from timing circuit 80 and, at the start of a modulate/compare period, the profile register 136 is set to a hold mode, so as to retain the data contained therein at that instant ($t_r$). The comparison function is performed by a digital comparator 138 which receives signals from A/D converter 130 and profile register 136. The number of comparisons made will again be governed by the same factors governing the operation of the comparator of FIG. 5. As noted above with regard to FIG. 5, compensation for EIC motion can be provided by adjustments of the data in the profile register 136 or, alternatively, by inserting a counter (not shown) between the profile register 136 and the comparator 138 which is programmed to start at the beginning of each modulate/compare period and whose counting direction and clock speed are a function of the reflected doppler shift.

Referring to FIG. 7, a block diagram is presented which is similar to that of FIG. 2 and which depicts a multi-channel automatic toll system in accordance with the invention. The basic units employed and principles of operation are the same as that of the single channel embodiment of FIG. 1 and corresponding units in FIG. 7 have been given the same numbers as like units in FIG. 2 with subscripts attached to indicate the associated channel, or with a prime attached where the unit is common to all channels. In general, the discussion of FIG. 7 will be limited to the additional units which are part of the multi-channel system.

As illustrated, the system of FIG. 7 includes n channels (only a portion of the channel "n" being shown) each channel comprising a transmitter and a receiver corresponding to that of FIG. 2. Because the use of multiple channels, r.f. channel selectors 150 and 152 are employed so that only one transmitter receiver pair is active during a given time period, channel selector 150 being connected between the outputs of amplifiers $44_1$, $44_2 \ldots 44_n$ (the latter of which is not specifically shown) and the inputs of low pass filters $46_1$, $46_2 \ldots 46_n$, and channel selector 152 being connected between mixers $60_1$, $60_2 \ldots 60_n$ and IF amplifier 88'. In this embodiment, the EIC 52' will also include further resonators, non-linear devices and antennas, as is indicated schematically. Similarly, the modulating signal generator or source 78' is modified so as to drive the plural modulators $36_1$, $36_2 \ldots 36_n$ (not shown) and $70_1$, $70_2 \ldots 70_n$ (not shown).

In order to minimize the electromagnetic energy radiated, a vehicle sensor system is employed which activates or enables the transmitter r.f. channel selector 150. The sensor system includes a vehicle sensor 154 which can comprise a photo-optical detector ("electric eye") or the like and a timer enable circuit 156 controlled by sensor 154. Timer enable circuit 156 is connected to a buffer timer 80d which controls channel selector 150 so that the latter is enabled only if a vehicle is in a predetermined interrogation area.

Additional timing circuitry is employed to cycle the transmitter and receiver in synchronism (and in sequence) and to initiate the modulate/compare function. The timing circuitry is also used, in some comparator embodiments, to control the transfer of the correct profile into the comparator at the appropriate time. At the end of each cycle, the timing circuitry initiates interrogation of decoder 94' to determine whether a "true" or "false" state exists and to cause transfer of the resultant signal to a traffic control unit 162. This latter unit may, for example, control actuation of a device such as a gate for preventing a vehicle from exiting the toll area. The timing circuitry is also used to trigger a decoder data erase mode and to reset the decoder 94' for the next data cycle. These expanded timing capabilities are illustrated by additional buffer timers 80c and 80d and additional dividers 158 and 160.

As stated above, the invention can be used in a number of applications in addition to being part of automatic vehicle toll system. For example, the invention can be adapted for use as a personnel or vehicle recognition system used for security purposes and, in this regard, the card can be made to be visually concealable. Other exemplary uses include use as an electronic classification system or as an electronic material handling and/or motion control system.

Although the invention has been described relative to exemplary embodiments thereof, it will be understood that other variations and modifications can be effected in these embodiments without departing from the scope and spirit of the invention.

I claim:

1. An electronic detection and identification system comprising, in combination, an electronic transmitter-receiver unit and a carrier member containing passive circuitry thereon for reflecting a signal comprising at least one selected harmonic of the signal transmitted thereto from said transmitter-receiver unit, said unit comprising a transmitter comprising a radio frequency source for generating a radio frequency signal, means for frequency sweeping said radio frequency signal with a frequency varying signal to produce a frequency swept signal and means for radiating said frequency swept signal towards said carrier member; and a receiver comprising means for receiving the signal reflected by the passive circuitry of carrier member; amplitude detector means for detecting the instantaneous amplitude envelope of the received signal; means for providing a predetermined reference signal representative of the expected received signal envelope profile corresponding to the selected harmonic of the transmitted signal and comparator means for comparing, in the time domain, the amplitude envelope of the detected signal with said reference signal, said comparator means comprising at least two comparators for comparing the amplitude envelope of the detected signal at at least two points in time sequence respectively representative of two different frequencies with two corresponding points of the reference signal.

2. A system as claimed in claim 1 wherein said carrier member comprises a card containing an antenna and at least one resonator printed thereon.

3. A system as claimed in claim 2 wherein said card comprises a dipole antenna and at least one resonator strip printed thereon and a non-linear device connected to said at least one resonator strip.

4. A system as claimed in claim 1 wherein said sweeping means comprises means for sweeping said radio frequency signal with a frequency ramp function whereby said radio frequency signal is swept through resonant frequency of the circuitry carried by said carrier member.

5. A system as claimed in claim 1 wherein said transmitter-receiver unit includes frequency multiplier means for multiplying the said radio frequency by a factor sufficient to produce a radiated signal having a frequency at least of 3 GHz.

6. A system as claimed in claim 1 wherein said transmitter-receiver unit includes mixer means connected in advance of said amplitude detector means, for converting the received signal to an intermediate frequency signal.

7. A system as claimed in claim 6 wherein the receiver of said transmitter-receiver unit includes an oscillator and means for converting the output frequency of said oscillator into a local oscillator frequency which forms one input of said mixer means, the other input to said mixer means being said received signal.

8. A system as claimed in claim 7 wherein said transmitter further comprises a transmitter reference multiplier chain and a transmitter data reference multiplier chain and said receiver further comprises a receiver reference multiplier chain which operates in the same manner as said transmitter reference multiplier chain and a receiver data multiplier chain which operates in the same manner as said transmitter data multiplier chain, said frequency sweeping means being located in said transmitter data multiplier chain and said receiver data multiplier chain including a corresponding frequency sweeping means located therein in an equivalent position, said receiver further comprising further mixer means connected to the outputs of said reference multiplier chains, a further receiver oscillator for producing a signal of said intermediate frequency, and a phase locked loop connected to the outputs of said further mixer means and said further receiver oscillator, the first mentioned receiver oscillator comprising a voltage controlled oscillator connected to the output of said phase locked loop.

9. A system as claimed in claim 3 wherein said transmitter includes a first multiplier chain and said frequency sweeping means is located in said chain such that the modulating frequency is swept through the resonant frequency of the circuitry carried by said card.

10. A method of detecting and identifying a moving body employing an electronic identification card, carried by said body and comprising passive resonant circuit means for generating a characteristic output signal in response to a signal containing covering a predetermined range of frequencies being transmitted thereto, said method comprising:
generating a signal of a first frequency;
frequency sweeping said signal to produce a frequency swept transmit signal;
radiating said transmit signal towards said card, said transmit signal being processed so as to raise the frequency thereof to the Gigahertz range;
receiving the signal reflected from said card;
amplitude detecting the received signal so as to produce an output signal corresponding to the envelope of the received signal;
providing a predetermined reference signal representative of the expected received signal envelope profile corresponding to the characteristic output signal produced by said card; and
utilizing at least two comparators to compare in the time domain and in time sequence at least two points on said envelope respectively representative of two different frequencies with corresponding points on the reference envelope profile so as to determine the characteristics of the card from which the transmit signal was reflected.

11. A method as claimed in claim 10 further comprising down converting the frequency of the received signal so that the comparing step takes place at a frequency which is substantially less than that of the transmit signal.

12. A method as claimed in claim 10 wherein said sweeping step comprises sweeping said first frequency with a cyclically repeated ramp function which provides a frequency sweep at or near the expected resonant frequency of said resonant circuit means of said card.

* * * * *